United States Patent Office 2,811,524
Patented Oct. 29, 1957

2,811,524

3-[BETA - KETO - GAMMA-(1,4,5,6-TETRAHYDRO-2-PYRIDYL) PROPYL] - 4 - QUINAZOLONE COMPOUNDS AND METHODS OF MAKING THE SAME

Bernard R. Baker, Nanuet, N. Y., assignor to American Cyanamid Company, New York, N. Y., a corporation of Maine No Drawing. Application March 17, 1951,
Serial No. 216,262

14 Claims. (Cl. 260—256.4)

This invention relates to new 3-[beta-keto-gamma-(tetrahydropyridyl) - propyl] - 4 - quinazolones, the salts thereof and the methods of making the same.

The new compounds of this invention may be represented by the following structural formula:

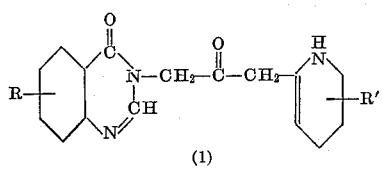

(1)

in which R is hydrogen or at least one substituent upon the quinazolone nucleus and in which R' is hydrogen or a substituent upon the tetrahydropyridyl nucleus connected to the carbon by an oxygen to carbon linkage.

The substituent or substituents represented by R in the above formula may vary within wide limits and may be on one or more of the two, five, six, seven or eight positions of the quinazolone nucleus. Substituents of the following types are of value: halogen, for instance Cl, Br, and Fl; alkoxy and aryloxy, for instance —OCH₃, —OC₂H₅, —OCH₂C₆H₅, and —OC₆H₅; hydroxyl radicals; lower alkyl radicals, for instance methyl, ethyl, propyl and butyl; aryl radicals, for instance phenyl and substituted phenyl radicals; acyl radicals, for instance —COR in which R is hydrogen or lower alkyl; acyloxy radicals, for instance —OCOR in which R may represent H or lower alkyl; carboxyl radicals (—COOH) and the esters, amides and salts thereof.

The radical represented by R' in the above formula may also vary within wide limits as long as it is attached to the tetrahydropyridyl nucleus by an oxygen to carbon linkage. By way of illustration, suitable substituents are: hydroxy; aryloxy, for instance phenoxy; alkoxy, for instance methoxy, ethoxy, and propoxy; aralkoxy, for instance alpha-toloxy; acyloxy, for instance acetoxy and benzoyloxy; and the like. Such substituents may be on one or more of the 3, 4, 5 and 6 positions of the tetrahydropyridyl nucleus.

Generally speaking, the new compounds of this invention are crystalline solids only slightly soluble in most organic solvents but soluble in dilute mineral acids. They may be isolated as the free base or if desired they may be isolated in the form of their addition salts with acids, for instance as the hydrochloride. They are of great value as intermediates in organic synthesis, for instance in the preparation of certain pharmaceuticals. As an illustrative example, the new compounds of this invention can be transformed into materials possessing antimalarial activity by a procedure which comprises reducing the tetrahydropyridyl nucleus to a piperidine nucleus as disclosed in copending U. S. application S. N. 216,261, filed March 17, 1951, by Bernard R. Baker and Merle V. Querry.

While it is intended that this invention cover the new compounds regardless of how they are prepared, a convenient method of preparing the new compounds has been discovered and this method also constitutes a part of the invention. The new method comprises cyclizing a salt of a 3-(2,4-diketo-8-aminooctyl)-4-quinazolone by neutralizing the same with a base as may be illustrated by the following equation:

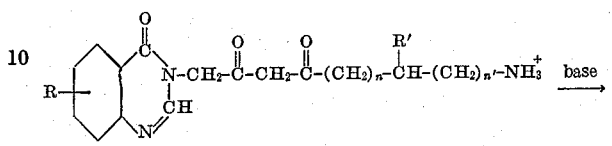

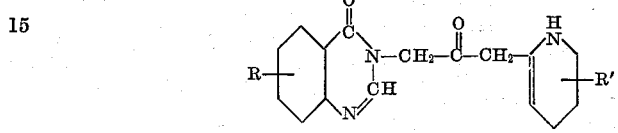

in which R and R' are as defined above and where $n$ and $n'$ are integers between 0 and 3 inclusive and the total of $n$ plus $n'$ equals three.

The reaction is preferably performed in aqueous solution. Of course, by aqueous it is meant that some water is present, for instance a molar quantity equal to the quantity of the diketone, and various amounts of inert organic solvents may also be present. Illustrative of such organic solvents are the following: aliphatic alcohols, for instance ethyl alcohol; lower fatty acids, for instance acetic acid; cyclic ethers, for instance dioxane; and glycol ethers, for instance 2-methoxyethanol. The order of addition of the reactants is immaterial and the base may be added to an aqueous solution of the quinazolone compound, the quinazolone compound may be added to an aqueous solution of the base, or both may be dissolved separately and the two solutions mixed.

Any base which is stronger than the amine of the diketone, or in other words has a dissociation constant in water greater than about $1 \times 10^{-5}$, may be employed. Illustrative of such bases are the following: metal hydroxides, for instance sodium hydroxide and barium hydroxide; alkali metal carbonates, for instance sodium carbonate; alkali metal bicarbonates, for instance sodium bicarbonate; strong amine bases, for instance piperidine. The base should be employed in at least stoichiometrical amounts and preferably in excess.

The reaction may be performed at room temperature or at any other temperature below the decomposition point of the diketone. As a matter of convenience one is usually limited to a temperature range between the boiling and freezing temperatures of the aqueous solvent but pressure and higher temperatures may be employed if desired. Even at very low temperatures, for instance —5° C., the reaction is almost instantaneous.

The acid addition salts of the 3 - (2,4 - diketo - 8-aminooctyl) - 4 - quinazolones employed as starting materials in the above reaction may be prepared by the acid hydrolysis of the corresponding 3 - (2,4-diketo-8-acidamidooctyl)-4-quinazolones as illustrated by the following equation:

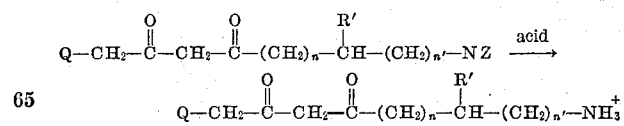

where Q is a quinazolone nucleus, NZ is an acidamido radical and R', $n$ and $n'$ are as defined above. The 3-(2,4-diketo-8-acidamido)-4 - quinazolones of the above formula constitute a part of the subject matter of a copending U. S. application S. N. 208,432 of B. R. Baker and M. V. Querry, filed January 29, 1951. The acid amido group may be formed from practically any acyl radical as may be illustrated by the following suitable acidamido groups: acetamido or amido groups formed from other lower fatty acids; benzamido or amido groups formed from other aromatic carboxylic acids; phthalimido or amido groups derived from other dicarboxylic acids; carbethoxyamino or amido groups derived from other alkyl chlorocarbonates; carbobenzoxyamido or amido groups derived from other aralkyl chlorocarbonates. Often it is found convenient to employ a salt, for instance the copper salt, of the diketone as a starting material but this is equivalent to employing the free diketone as the salt is neutralized by the acid before hydrolysis occurs.

The acid hydrolysis is also preferably performed in an aqueous medium. Any nonoxidizing acid having a dissociation constant in water greater than $1 \times 10^{-2}$ is suitable for acidifying the aqueous medium as may be illustrated by the following suitable examples: mineral acids, for instance hydrochloric, hydrobromic, sulfuric and phosphoric; organic acids, for instance toluene sulfonic. The concentration of the acid may vary within wide limits, however, higher acid concentrations increase the reaction velocity and are, therefore, desirable. Generally speaking the hydrolysis proceeds satisfactorily with acid concentrations of about 0.1N to 24N and acid concentrations of 4N to 8N are preferred. In many instances it is not necessary to isolate the 3-(2,4 - diketo - 8 - aminooctyl) - 4-quinazolone addition salt and sufficient base is simply added to the reaction mixture to basify the solution and thus form the 3-[beta-keto-gamma-(tetrahydropyridyl) - propyl]-4-quinazolone.

The acid hydrolysis may be carried out at room temperature or even at lower temperatures, for instance 20° C. As higher temperatures increase the reaction velocity, however, it is advantageous to employ temperatures in the range of about 90–110° C., or in some instances up to 150° C. The reaction velocity is also affected by other factors, for instance by the particular acid employed and by the particular acidamido group present in the 3-(2,4-diketo-8-aminooctyl) - 4-quinazolones. Under optimum conditions the hydrolysis is substantially complete in about five minutes.

The invention will be more fully described by means of the following illustrative examples in which all parts are by weight unless otherwise indicated.

*Example I*

A solution of 6.0 parts by weight of sodium methoxide, 24 parts by volume of methyl acetoacetate and 30 parts by weight of gamma-bromopropylphthalimide (Ber., 21, 2671) in 1500 parts by volume of methanol is refluxed for sixteen hours, then 300 parts by volume of 3 N hydrochloric acid is added and the refluxing continued for four hours. The solution is concentrated in vacuo and the separating oil extracted with ethyl acetate. Evaporation of the extract gives crude 1-phthalimido-5-hexanone as an oil. When purified through its sodium bisulfite derivative, this compound forms white crystals having a melting point of 66–68° C. It is readily soluble in alcohol, acetone, ether or benzene but insoluble in water or petroleum ether.

A mixture of 49 parts by weight of crude 1-phthalimido-5-hexanone, 490 parts by volume of benzene, 29 parts by volume of absolute ethanol, 33.3 parts by weight of ethyl 4- quinazolone-3-acetate and 9.8 parts by weight of sodium methoxide is refluxed for one hour, then acidified with 40 parts by volume of acetic acid and washed with water. The organic solution is evaporated, the residue dissolved in ethyl acetate and shaken with 300 parts by volume of 10% cupric acetate. The copper derivative of 3-(beta,delta,diketo-omega-phthalimidooctyl)-4-quinazolene separates as blue green crystals having a melting point of about 235° C. with decomposition.

A mixture of 1 part by weight of the copper derivative of 3-(beta,delta-diketo-omega-phthalimidooctyl)-4-quinaz- olone and 20 parts by weight of 6 N hydrochloric acid is refluxed for six hours. The solution is concentrated in vacuo until phthalic acid separates, then it is cooled and filtered. The filtrate is evaporated to dryness in vacuo, the residue dissolved in water and poured into excess ammonia water. The mixture is then extracted with chloroform. The combined extracts are evaporated to dryness in vacuo after clarification with activated carbon (Norit). Trituration of the residue with ethyl acetate gives 3-[beta-keto-gamma-(1,4,5,6-tetrahydro-2-pyridyl)-propyl]-4-quinazolone having a melting point of about 177–180° C. Recrystallization from alcohol gives white crystals having a melting point of about 175–178° C. This compound is soluble in hot alcohol, but insoluble in cold alcohol, benzene, ethyl acetate or petroleum ether.

*Example II*

A mixture of 11.4 parts by weight of sodium methoxide, 285 parts by volume of methanol, 45 parts by volume of methylacetoacetate and 57 parts by weight of gamma-bromopropylphthalimide is refluxed for eighteen hours, diluted with several volumes of water and extracted with chloroform. The combined extracts, evaporated to dryness in vacuo, leave a residue which is refluxed with 570 parts by volume of 6 N hydrochloric acid for nine hours. The cooled mixture is filtered from phthalic acid and the filtrate evaporated to dryness in vacuo. The residue of 1-amino-5-hexanone hydrochloride is dissolved in 168 parts by volume of water, then a solution of 14 parts by weight of sodium hydroxide in 84 parts by volume of water is added. The stirred mixture is treated dropwise with 20 parts by volume of benzoyl chloride over a period of ten minutes, then stirred twenty minutes longer. After the addition of 7 parts by weight of sodium hydroxide in 42 parts by volume of water and 5 parts by volume of benzoyl chloride, the mixture is stirred ten minutes more. The oil is extracted with benzene. Evaporation gives 26 parts by weight of crude 1-benzamido-5-hexanone.

A mixture of 13 parts by weight of crude 1-benzamido-5-hexanone, 4.1 parts by weight of sodium methoxide, 11 parts by volume of absolute ethanol, 13.7 parts by weight of ethyl 4-quinazolone-3-acetate and 130 parts by volume of benzene is refluxed for one hour, acidified with 5 parts by volume of acetic acid, diluted with ethyl acetate and washed with water. The organic layer is evaporated and the residue crystallized from ethyl acetate to yield white crystals of 3-(beta,delta-diketo-omega-benzamidooctyl)-4-quinazolone having a melting point of about 125–127° C. This compound gives a wine-red ferric chloride test and is soluble in hot alcohol or hot ethyl acetate, but insoluble in cold alcohol, ethyl acetate, water or petroleum ether.

A solution of 7 parts by weight of 3-(beta,delta-diketo-omega-benzamidooctyl)-4-quinazolone in 70 parts by volume of 6 N hydrochloric acid is refluxed four hours, cooled and filtered from benzoic acid. The filtrate is evaporated to dryness in vacuo, dissolved in water, made basic with potassium carbonate and extracted with chloroform. Evaporation of the extracts and trituration with ethyl acetate gives 3-[beta-keto-gamma-(1,4,5,6-tetrahydro-2-pyridyl)propyl]-4-quinazolone having a melting point of about 167–170° C.

*Example III*

The crude 1-amino-5-hexanone hydrochloride from 57 parts by weight of gamma-bromo-propylphthalimide is treated with 44 parts by volume of benzylchlorocarbonate in place of benzoyl chloride of Example II. The resulting 1-carbobenzoxyamino-5-hexanone is an oil which gives an orange 2,4-dinitrophenylhydrazone having a melting point of 106–108° C.

A solution of 5 parts by weight of 1-carbobenzoxy-amino-5-hexanone, 3 parts by volume of absolute alcohol, 3.4 parts by weight of ethyl 4-quinazolone-3-acetate and 1 part by weight of sodium methoxide in 50 parts by volume of benzene is refluxed one hour, then acidified with 2 parts by volume of acetic acid and washed with water. The organic solution is evaporated to dryness, the residue dissolved in 40 parts by volume of alcohol and diluted with 30 parts by volume of 10% cupric acetate. The copper derivative of 3-(beta,delta-diketo-omega-carbobenzoxyaminooctyl)-4-quinazolone separates as blue crystals having a melting point of about 184–185° C. The compound is soluble in hot alcohol, but insoluble in water.

A solution of 1 part by weight of the copper derivative of 3-beta,delta-diketo-omega-carbobenzoxyaminooctyl)-4-quinazolone in 10 parts by volume of 6 N hydrochloric acid is refluxed for fifteen minutes, then poured into excess acid ammonia and extracted with chloroform. Evaporation of the extracts and trituration of the residue with ethyl acetate gives white crystals of 3-[beta-keto-gamma-(1,4,5,6-tetrahydro-2-pyridyl)propyl]-4-quinazolone having a melting point of about 168–170° C.

*Example IV*

The crude 1-amino-5-hexanone hydrochloride from 60 parts by weight of gamma-bromo-propylphthalimide is treated with 23 parts by volume of ethyl chlorocarbonate in place of benzoyl chloride of Example II. The resulting 1-carbethoxyamino-5-hexanone is obtained as an oil which gives a yellow 2,4-dinitrophenylhydrazone having a melting point of 128–129° C.

A mixture of 5 parts by weight of 1-carbethoxyamino-5-hexanone, 66 parts by volume of benzene, 4 parts by volume of absolute ethanol, 4.5 parts by weight of ethyl 4-quinazolone-3-acetate and 1.3 parts by weight of sodium methoxide is refluxed for one hour. The blue crystals of the copper salt of 3-(beta,delta-diketo-omega-carbethoxyaminoctyl)-4-quinazolone, melting at 208–210° C. with decomposition, are isolated by the procedure of Example III. This compound is insoluble in the usual solvents.

A solution of 1.8 parts by weight of the copper derivative of 3-(beta,delta-diketo-omega-carbethoxyaminooctyl)-4-quinazolone in 20 parts by volume of 6N hydrochloric acid is refluxed for thirty-five minutes. The crystals of 3-[beta-keto-gamma-(1,4,5,6-tetrahydro-2-pyridyl)-4-quinazolone having a melting point of about 171–175° C. are isolated as in Example III.

*Example V*

A solution of 174 parts by weight of allylphthalimide (Ber., 23, 999) and 285 parts by weight of mercuric acetate in 1745 parts by volume of methanol is refluxed with stirring for ten minutes. A solution of 156 parts by weight of potassium iodide in 310 parts by volume of water is added and the mixture again refluxed ten minutes. Then 256 parts by weight of iodine is added. After being refluxed for fifteen minutes more a solution of 178 parts by weight of potassium iodide in 1260 parts by volume of water is added followed by sufficient sodium bisulfite to bleach the excess iodine. The mixture is diluted to 5000 parts by volume with water and cooled. The precipitate is recrystallized from alcohol giving white crystals of 2-methoxy-3-iodo-propylphthalimide having a melting point of about 105–107° C.

A mixture of 47 parts by weight of sodium methoxide, 464 parts by volume of t-butyl alcohol, 243 parts by weight of 2-methoxy-3-iodopropylphthalimide and 165 parts by volume of methyl acetoacetate is refluxed forty-two hours, then acidified with 47 parts by volume of acetic acid and evaporated to dryness in vacuo. The residue is refluxed with 555 parts by volume of alcohol and 555 parts by volume of 3N hydrochloric acid for three hours, concentrated to about one-half volume in vacuo, diluted with water and extracted with ethyl acetate. The extract, washed with aqueous sodium bicarbonate and dried, is evaporated to dryness. The residual crude 1-phthalimido-2-methoxy-5-hexanone is about 30% pure. It is purified through its solid sodium bisulfite derivative with about 99% recovery. This ketone is an oil soluble in alcohol, ethyl acetate and benzene, but insoluble in water. Its 2,4-dinitrophenylhydrazone forms orange crystals having a melting point of about 180.5–181° C.

A mixture of 41 parts by weight of 1-phthalimido-2-methoxy-5-hexanone and 410 parts by volume of 6N hydrochloric acid is refluxed three hours, cooled, filtered and the filtrate evaporated to dryness in vacuo. The residual crude 1-amino-2-methoxy-5-hexanone hydrochloride is dissolved in 176 parts by weight of water and basified with a solution of 12.6 parts by weight of sodium hydroxide in 74 parts by volume of water. After the addition of 17.9 parts by volume of benzoyl chloride, the mixture is stirred twenty minutes. The mixture is treated with 6.3 parts by weight of sodium hydroxide in 22 parts by volume of water, then 4.5 parts by volume of benzoyl chloride is added and the stirring continued for thirty minutes more. The oil is removed by extraction with benzene. The combined extracts, washed with dilute acid and water, are evaporated leaving 26 parts by weight of 1-benzamido-2-methoxy-5-hexanone as an oil soluble in alcohol, benzene or acetone, but insoluble in water. The 2,4-dinitrophenylhydrazone forms yellow crystals having a melting point of about 132–134° C.

A mixture of 26 parts by weight of 1-benzamido-2-methoxy-5-hexanone, 28.5 parts by weight of ethyl 4-quinazolone-3-acetate, 260 parts by volume of benzene, 22 parts by volume of absolute alcohol and 7.6 parts by weight of sodium methoxide is refluxed for one hour, acidified with 15 parts by volume of acetic acid and washed with water. The organic layer is evaporated, the residue dissolved in 236 parts by volume of ethyl acetate and treated with 213 parts by volume of 10% cupric acetate. The blue crystals of the copper derivative of 3-(2,4-diketo-7-methoxy-8-benzamidooctyl) - 4 - quinazolone separate; melting point about 218–220° C. with decomposition. This compound is insoluble in common organic solvents.

A solution of 12.2 parts by weight of the copper derivative of 3-(2,4-diketo - 7 - methoxy-8-benzamidooctyl)-4-quinazolone is 47 parts by volume of water and 15.6 parts by volume of 96% sulfuric acid is refluxed for two hours, then poured into ice and 62 parts by volume of 28% ammonia water. The mixture is extracted with chloroform. The dried extracts are evaporated and the residue refluxed with 51 parts by volume of 48% hydrobromic acid for twenty minutes, then poured into ice and 51 parts by volume of 28% ammonia water. The precipitate is collected on a filter and washed with water. The combined filterate and washings are extracted with chloroform. The precipitate is added to the extracts, heated and sufficient 2-methoxyethanol added to dissolve the solid. The solution is dried and evaporated in vacuo. Trituration of the residue with ethyl acetate gives 3-[beta-keto - gamma - (5-hydroxy-1,4,5,6-tetrahydro-2-pyridyl)-propyl]-4-quinazolone having a melting point of about 219–223° C. Recrystallization from alcohol gives white needles having a melting point of about 229–230° C. This compound is soluble in hot alcohol or hot 2-methoxyethanol but insoluble in cold alcohol, benzene or petroleum ether.

*Example VI*

A mixture of 4 parts by weight of acetanthranil (J. Am. Chem. Soc., 29, 529), 1.85 parts by weight of glycine and 4 parts by volume of diethyl carbitol is heated at 175–185° C. for fifteen minutes. Addition of 15 parts by volume of alcohol and cooling give white crystals of 2-methyl-4-quinazolone-3-acetic acid having a melting point of about 263° C. with decomposition after recrystallization from 2-methoxyethanol.

To a suspension of 3 parts by weight of 2-methyl-4-quinazolone-3-acetic acid in 17 parts by volume of methanol there is added 1.7 parts by volume of acetyl chloride. The solution is refluxed for thirty minutes, cooled, diluted with water and neutralized with sodium bicarbonate. The mixture is extracted with chloroform. The extracts are evaporated and the residue recrystallized from benzene-heptane to give white crystals of methyl 2-methyl-4-quinazolone-3-acetate having a melting point of about 114–115° C.

A mixture of 5.8 parts by weight of methyl 2-methyl-4-quinazolone-3-acetate, 7 parts by weight of 1-carbethoxyamino-5-hexanone (prepared by the procedure of Example IV), 83 parts by volume of benzene, 5 parts by volume of absolute alcohol and 1.7 parts by weight of sodium methoxide is refluxed for one hour. The blue crystals of the copper derivative of 2-methyl-3-(2,4-diketo-8-carbethoxyaminooctyl)-4-quinazolone separate; melting point about 201–202° C. with decomposition. This compound is insoluble in common solvents.

A solution of .15 part by weight of the copper salt of 2-methyl-3-(2,4-diketo - 8 - carbethoxyaminooctyl)-4-quinazolone in 1.45 parts by volume of 48% hydrobromic acid is refluxed for five minutes, then poured into ice and 3 parts by volume of 28% ammonia water and extracted with chloroform. The dried extracts are evaporated and the residue triturated with ethyl acetate to give 2-methyl-3-[beta - keto - gamma - (1,4,5,6-tetrahydro-2-pyridyl)propyl]-4-quinazolone having a melting point of about 195–198° C. Recrystallization from alcohol gives white leaflets having a melting point of about 198–198.5° C. This compound is soluble in hot alcohol or chloroform, but insoluble in cold alcohol, water, ethyl acetate or petroleum ether.

*Example VII*

To a solution of 44 parts by weight of 5-methyl-4-quinazolone (Ber., 52, 1084) and 14.8 parts by weight of sodium methoxide in 400 parts by volume of absolute alcohol there is added 28.8 parts by volume of ethyl chloroacetate. The mixture is refluxed two hours, diluted with water and extracted with chloroform. Evaporation of the extracts to dryness in vacuo and crystallization of the residue from heptane gives ethyl 5-methyl-4-quinazolone-3-acetate.

Example V is repeated except that 30.5 parts by weight of ethyl 5-methyl-4-quinazolone-3-acetate are employed in place of the ethyl 4-quinazolone-3-acetate of that example. White crystals of 3-[beta-keto-gamma-(5-hydroxy-1,4,5,6-tetrahydro-2-pyridyl)propyl]-5-methyl-4-quinazolone are obtained in equally good yield.

*Example VIII*

A mixture of 48 parts by weight of 6-chloroanthranilic acid (Monats., 22, 488) in 42 parts by volume of formamide is heated at about 130–135° C. for forty-five minutes and at 175° C. for seventy-five minutes. Addition of 72 parts by volume of 2-methoxyethanol and 720 parts by volume of water gives 5-chloro-4-quinazolone having a melting point of about 210° C. after recrystallization from aqueous 2-methoxyethanol.

To a solution of 37.2 parts by weight of 5-chloro-4-quinazolone and 11.1 parts by weight of sodium methoxide in 300 parts by volume of absolute alchol there is added 21.6 parts by volume of ethyl chloroacetate. The mixture is refluxed two hours, diluted with water and extracted with chloroform. Evaporation of the extracts to dryness in vacuo and crystallization of the residue from heptane gives ethyl 5-chloro-4-quinazolone-3-acetate.

Example V is repeated except that 32.5 parts by weight of ethyl 5-chloro-4-quinazolone-3-acetate are employed in place of the ethyl 4-quinazolone-3-acetate of that Example. White crystals of 3-[beta-keto-gamma-(5-hydroxy-1,4,5,6-tetrahydro - 2 - pyridyl)propyl]-5-chloro-4-quinazolone are obtained in equally good yield.

I claim:
1. The 3-[beta-keto-gamma-(tetrahydropyridyl)propyl]-4-quinazolones represented by the formula:

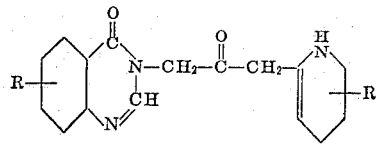

in which R is a lower alkyl substituent and in which R' is a hydroxy group.

2. 3 - [beta-keto-gamma-(5-hydroxy-1,4,5,6-tetrahydro-2-pyridyl)propyl]-5-methyl-4-quinazolone.

3. The 3-[beta-keto-gamma-(tetrahydropyridyl)propyl]-4-quinazolones represented by the formula:

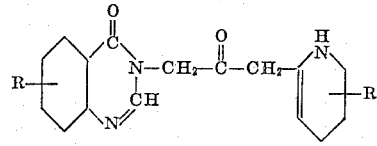

in which R represents halogen and R' represents a hydroxy group.

4. 3 - [beta-keto-gamma-(5-hydroxy-1,4,5,6-tetrahydro-2-pyridyl)propyl]-5-chloro-4-quinazolone.

5. The 3 - [beta-keto-gamma-(tetrahydropyridyl)propyl]-4-quinazolones represented by the formula:

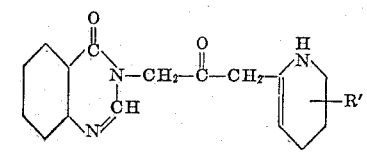

in which R' represents a hydroxy group.

6. 3 - [beta-keto-gamma-(5-hydroxy-1,4,5,6-tetrahydro-2-pyridyl)propyl]-4-quinazolone.

7. A method of producing 3-[beta-keto-gamma(hydroxytetrahydropyridyl)propyl]-alkyl-4-quinazolones represented by the formula:

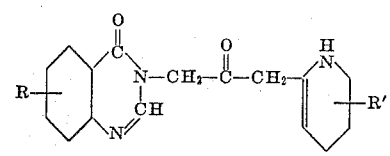

in which R is a lower alkyl substituent and in which R' is a hydroxy group, which comprises contacting in aqueous solution a salt of a 3-(2,4-diketo-8-aminooctyl-4)-quinazolone represented by the formula:

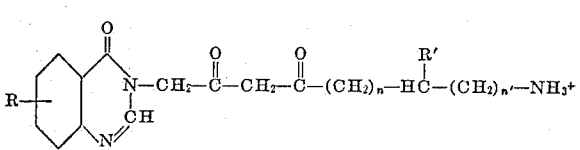

wherein R and R' are as defined above and wherein $n$ and $n'$ are integers between 0 and 3 inclusive and the total of $n$ plus $n'$ equals three, with a base having a dissociation constant in water greater than about $1 \times 10^{-5}$.

8. The process of producing compounds represented by the formula:

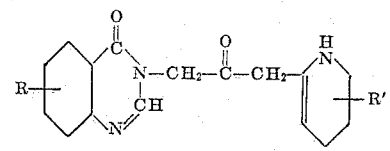

in which R represents a methyl group and R' represents a hydroxy group which comprises contacting in an aqueous solution a compound represented by the formula:

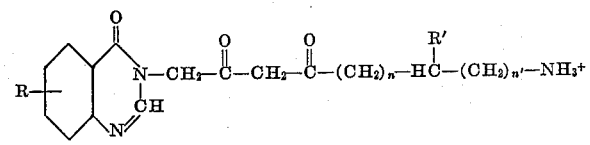

in which R represents a methyl substitutent, R' represents a hydroxy group, and in which $n$ and $n'$ represent integers between 0 and 3 inclusive and the total of $n$ plus $n'$ equals three, with a base having a dissociation constant in water greater than about $1 \times 10^{-5}$.

9. A method of producing 3-[beta-keto-gamma-(hydroxytetrahydropyridyl)propyl]-halo-4-quinazolones represented by the formula:

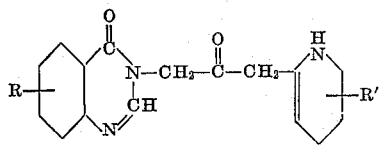

in which R represents halogen and R' represents a hydroxy group, which comprises contacting in aqueous solution a salt of a 3-(2,4-diketo-8-aminooctyl)-4-quinazolone represented by the formula:

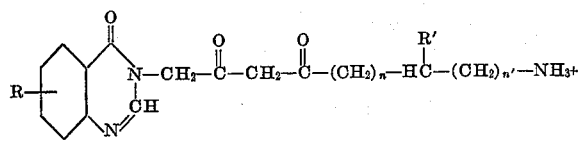

wherein R and R' are as defined above, and in which $n$ and $n'$ represent integers between 0 and 3 inclusive and the total of $n$ plus $n'$ equals three, with a base having a dissociation constant in water greater than about $1 \times 10^{-5}$.

10. The process of producing compounds represented by the formula:

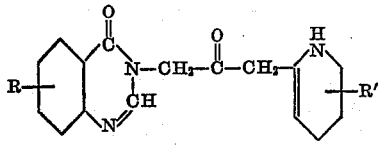

in which R represents a chloro substituent on the quinazolone nucleus and R' represents a hydroxy group on the tetrahydropyridyl nucleus, which comprises contacting in an aqueous solution a compound represented by the formula:

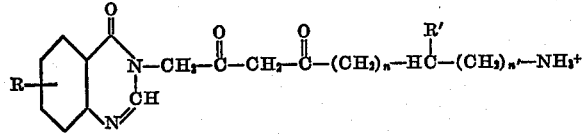

in which R represents a chloro substituent R' represents a hydroxy group, and in which $n$ and $n'$ represent integers between 0 and 3 inclusive and the total of $n$ plus $n'$ equals three, with a base having a dissociation constant in water greater than about $1 \times 10^{-5}$.

11. A method of preparing compounds represented by the formula:

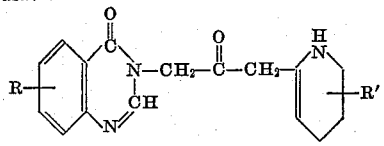

wherein R represents a lower alkyl substituent and R' represents a lower alkoxy substituent, which method comprises contacting in aqueous solution, a salt of a 3-(2,4-diketo-8-aminooctyl)-4-quinazolone represented by the formula:

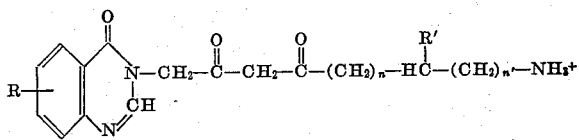

wherein R and R' are as defined above and wherein $n$ and $n'$ are integers between 0 and 3 inclusive and the total of $n$ plus $n'$ equals 3, with a base having a dissociation constant in water greater than about $1$ times $10^{-5}$.

12. A method of preparing compounds represented by the formula:

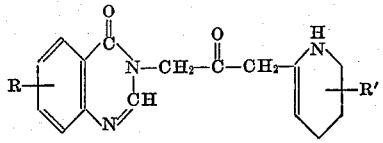

wherein R represents a halogen and R' represents a lower alkoxy substituent, which method comprises contacting in aqueous solution, a salt of a 3-(2,4-diketo-8-aminooctyl)-4-quinazolone represented by the formula:

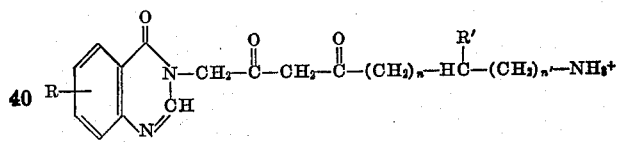

wherein R and R' are as defined above and wherein $n$ and $n'$ are integers between 0 and 3 inclusive and the total of $n$ plus $n'$ equals 3, with a base having a dissociation constant in water greater than about $1$ times $10^{-5}$.

13. A compound represented by the formula:

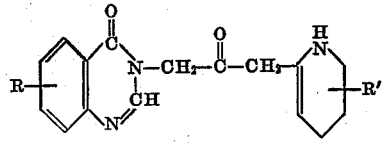

wherein R represents a lower alkyl group and R' represents a lower alkoxy group.

14. A compound represented by the formula:

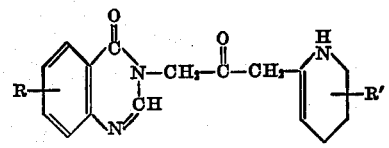

wherein R represents halogen and R' represents a lower alkoxy group.

No references cited.